United States Patent [19]

Waterhouse

[11] 3,768,938
[45] Oct. 30, 1973

[54] TEXTILE PROCESS AND APPARATUS

[75] Inventor: George Waterhouse, Cheshire, England

[73] Assignee: Ernest Scragg & Sons Limited, Macclesfield, England

[22] Filed: Apr. 9, 1971

[21] Appl. No.: 132,645

[30] Foreign Application Priority Data
Apr. 10, 1970 Great Britain................17289/70

[52] U.S. Cl. ................................................. 425/66
[51] Int. Cl. .......................................... B29d 23/03
[58] Field of Search...................... 425/66, 302, 325

[56] References Cited
UNITED STATES PATENTS

| | | | |
|---|---|---|---|
| 3,594,870 | 7/1971 | Schippers et al. | 425/66 |
| 3,104,937 | 9/1963 | Wyckoff et al. | 425/66 X |
| 3,466,358 | 9/1969 | Muller | 425/66 X |
| 3,470,288 | 9/1969 | Dunnington et al. | 425/66 X |

*Primary Examiner*—H. A. Kilby, Jr.
*Attorney*—Michael S. Striker

[57] ABSTRACT

Apparatus is provided for the manufacture of textile filamentary or fibrous products from fibrillatable thermoplastic material comprising a film extruder, a cooling roller on which the extruded film is laid by an air knife, film tensioning rollers, a heated film support roller and a cooled circumferentially grooved forging roller die which is urged against the film passing through a nip formed therebetween to deform the film and form latent filaments therein, further rollers for stretching the forged film and means for effecting or assisting fibrillation of the film into filamentary or fibrous form.

6 Claims, 2 Drawing Figures

Patented Oct. 30, 1973 3,768,938
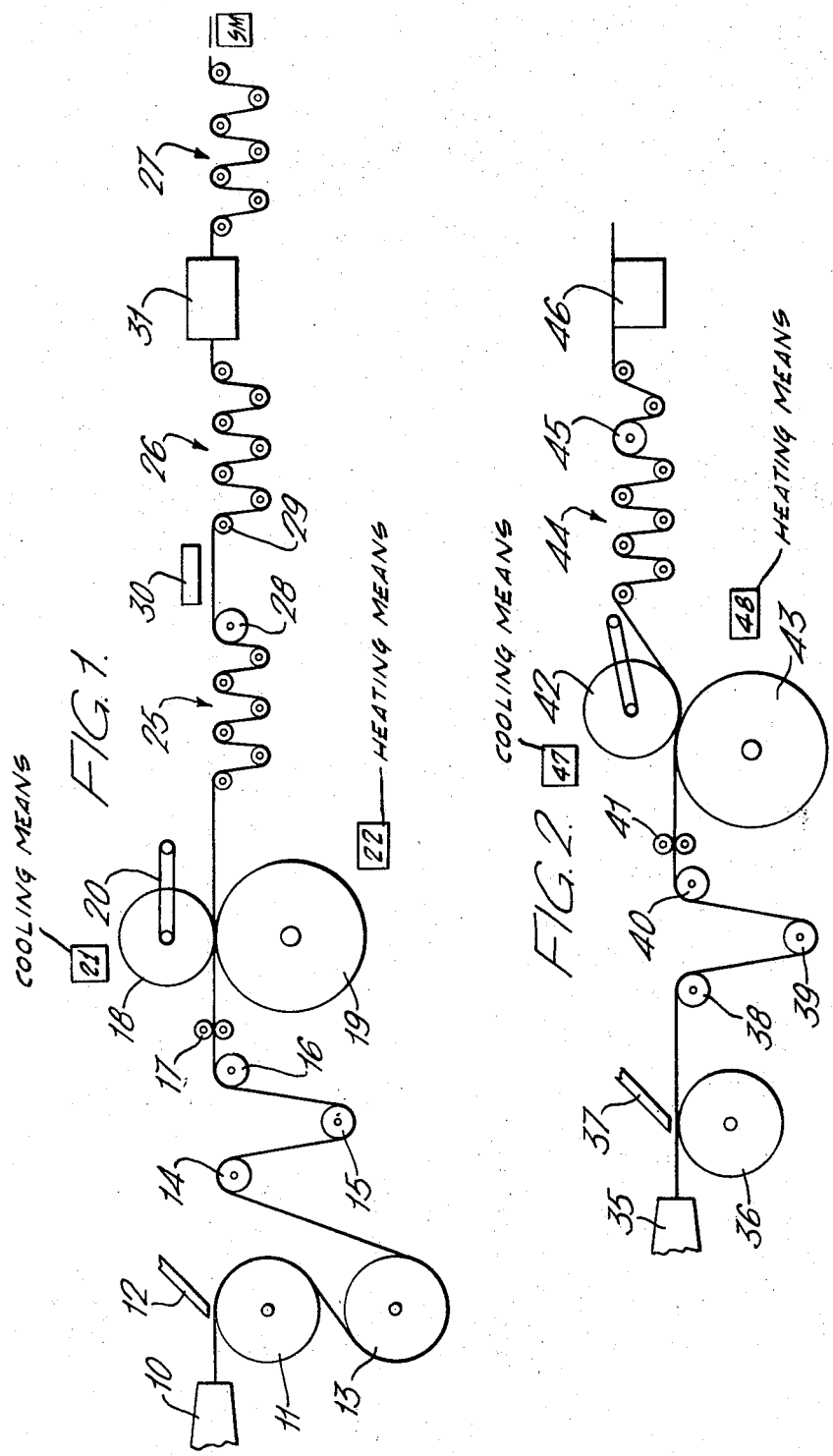
INVENTOR:
GEORGE WATERHOUSE

TEXTILE PROCESS AND APPARATUS

This invention relates to process and apparatus for the manufacture of textile filamentary and fibrous products from fibrillatable thermoplastic materials such as polypropylene.

According to the invention textile filamentary and fibrous products are made from thermoplastic material by extruding molten thermoplastic material in the form of flat wrinkle-free film, cooling the film to below the melting point of the material while in flat wrinkle-free condition to stabilise the film in that condition, advancing the film under tension and subjecting it to forging under heat and pressure so as to impart latent filament characteristics to the film, and stretching the film longitudinally to render it fibrillated or fibrillatable.

Apparatus according to the invention comprises, in sequence, a film extruder from which extruded film is delivered to a travelling film-cooling surface, means for laying the film against said surface, a film-tensioning arrangement, a driven forging roller die which is provided with circumferential grooves and ribs and which forms a nip with a film support roller and which is pressure-urged against the film to deform the film by forging and to form latent filaments therein, and means for stretching the film to an extent that it is fibrillated or fibrillatable.

Preferably the travelling film-cooling surface is the surface of a cooled roller, upon which the extruded film may be laid by an air knife.

The film-tensioning arrangement may comprise a train of guide rollers, comprising at least three rollers which define a zig-zag film feed path, at least the final roller being driven. One or both of the forging roller die and the film support roller can be cooled, or one can be cooled and the other heated, or both can be heated to the same temperature or to different substantially constant temperatures with the support roller the hotter of the two.

Preferred forging conditions for polypropylene film may be:

Pressure: 10 to 20 lbs per inch of film width. Forging roller die temperature: 90° to 95°C. Support roller temperature: 160° to 165°C The means for stretching the film may comprise tandem sets of godet rollers which provide a discrete drawing stage or stages, or alternatively no discrete drawing stage is provided and stretching is effected between the forging roller die and a set of godet rollers.

Means may also be provided for positively effecting or assisting splitting of the film into filamentary or fibrous form, and said means may operate during or after a drawing stage.

During a drawing stage a grooved separating component can be employed for splitting the film.

After drawing, splitting of the film may be effected by a grooved separating component, by passing the film about a sharp edge, by false-twisting, by transverse rubbing, by stuffer-box treatment, or by any combination thereof.

Furthermore splitting of the film may be effected or assisted either during or after the drawing stage by skew rollers.

Embodiments of the invention will now be described with reference to the accompanying drawings in which:

FIG. 1 is a diagrammatic side view of one form of apparatus.

FIG. 2 is a diagrammatic side view of a second form of apparatus.

Referring to FIG. 1, an extruder nozzle is indicated at 10 as delivering a film of material such as polypropylene on to a smooth-surfaced cooled metallic chill roller 11, upon which the film is laid flat, wrinkle-free and under little or no tension by an air knife 12 before passing about a second chill roll 13. The film in form-stable but forgeable condition passes through a film-tensioning arrangement of three rollers 14, 15, and 16, which define a zig-zag film feed path, the final roller 16 being driven. A roller feed system 17 which offers further film tension control may also be provided. A cooling-air jet 21 can be provided as shown, and also a radiant heater 22.

The forgeable film is then subjected to the action of a forging roller die 18 which forms a nip with a support roller 19. The roller die 18, carried as by pivot arms of which one is seen at 20, is pressure-urged against the film on the support roller 19. As previously mentioned the roller die 18 has circumferential ribs or grooves, or is otherwise profiled, to deform the film by forging to form latent filaments therein.

Temperature control of the film, the forging roller die 18 and/or the support roller 19 are techniques which can be applied selectively for precise control of the formation of latent filaments in the film and for control of the properties and characteristics of the filamentary and fibrous products eventually produced from the forged embossed film. Thus either or both can be cooled, or one heated and one cooled, or both heated to the same or to different substantially constant temperatures. Cooling means 47 and heating means 48 may be provided for this purpose.

After the embossed forged film, now latent-filament conditioned, leaves the forging roller die 18 it passes to a drawing stage comprising tandem spaced sets 25, 26 and 27 of godet rollers. In each set the rollers are all driven at the same rate of rotation, but the rate of rotation is higher from set to set.

It can be seen in FIG. 1 that the last godet roller 28 in the first set 25 is shown as of larger diameter than the other rollers in the set and therefore has a higher peripheral speed than the other rollers. This roller 28 is heated.

The first godet roller 29 in the next set 26 is also heated and is shown as of smaller diameter than the other rollers in the set 26. The roller 29 is driven to rotate at the same peripheral speed as that of the last roller 28 in the first set 25, while the remaining larger diameter rollers in the second set 26 have a higher peripheral speed than the roller 29. Hence the film is stretched between the two sets of godet rollers 25 and 26.

Of course the two sets 25 and 26 could each have rollers of the same size, with stretching of the film occurring between the two roller sets where the film would be heated as by a separate heater, indicated at 30, which could also be used with either of the rollers 28 or 29 differing in size.

It is to be understood that the invention is not limited to any particular method or apparatus for stretching the film.

From the last godet roller of the second set 26, the film passes through a heating oven 31 to the third set 27 of equal-diameter godet rollers. Between the two sets 26 and 27 the heated film is given the maximum intended stretch.

Following the final set 27 of godet rollers, if not already fully separated into filaments the film can be positively fibrillated by any suitable mechanism or means, such as the splitting means SM and the separated filaments so produced can be wound into packages, chopped into staple length fibres, or otherwise dealt with as is well-known in the textile art.

Referring now to FIG. 2, a film extruder nozzle 35 is again provided to deliver film material to chill roller 36 with the aid of an air knife 37, and three tension rollers 38, 39 and 40 are again employed to tension the film, as well as a roller feed system 41. A forging roller die 42 forms a nip with a support roller 43, and is pressure urged against it. It will be noted that the forging roller die 42, carried by pivot arms of which one is seen at 44, does not have its axis vertically above the axis of the support roller 43, but offset in the direction of travel of the film.

Furthermore, the film does not leave the nip of the die 42 and roller 43 in a direction of travel at 90° to a line connecting their axes, but travels about the die 42 for some distance before leaving the die 42 in a tangential and upward direction to pass to a set 44 of two godet rollers which effect stretching of the film in a drawing stage which could be heated and which extends from the nip of the die 42 and roller 42 to the godet roller set 44.

The final godet roller 45 of the set 44 can be heated and any suitable fibrillator means or mechanism, indicated at 46, can be provided after the godet roller set 44.

The temperatures at which the film is processed at any stage in its travel through the apparatus depend upon the material of the film and the properties and characteristics required to be present in the filamentary or fibrous end products, and it will be apparent that such processing temperatures are readily controllable as by having temperature-controlled forging roller dies 18 and 42, and/or support rollers 19 and 43, or otherwise providing for both heating or cooling of the film at appropriate locations. A cooling-air jet 47 and a radiant heater 48 can be provided for this purpose.

What is claimed is:

1. In apparatus for the manufacture of textile filamentary and fibrous products from thermoplastic materials, the combination of, in sequence, a film extruder; a travelling film-cooling surface located to receive film delivered by said extruder; means for laying the extruded film against said cooling surface; a film tensioning mechanism; a film support roller; a forging roller die which forms a nip with the support roller and is pressure-urged against the film passing through said nip to deform the film by forging and to form latent filaments therein; means for cooling one and for heating the other of said film support roller and said forging roller die; means for stretching the film; and means for forming filamentary or fibrous products from said stretched film.

2. Apparatus according to claim 1, wherein the travelling film-cooling surface is the surface of a cooled roller, and an air knife lays the extruded film upon the cooled roller.

3. Apparatus according to claim 1, wherein the means for stretching the film comprises tandem sets of godet rollers providing at least one drawing stage.

4. Apparatus according to claim 1, wherein said means for forming include splitting means for splitting the film into filamentary or fibrous form.

5. Apparatus according to claim 3 wherein said means for forming include splitting means for splitting the film into filamentary or fibrous form during a drawing stage provided by said godet roller sets.

6. Apparatus according to claim 3, wherein said means for forming include splitting means for splitting the film into filamentary or fibrous form, after a drawing stage provided by said godet roller sets.

* * * * *